United States Patent
Gondo et al.

(10) Patent No.: US 9,710,441 B2
(45) Date of Patent: Jul. 18, 2017

(54) CONTENT REPRODUCING APPARATUS

(71) Applicant: KABUSHIKI KAISHA TOSHIBA, Tokyo (JP)

(72) Inventors: Shunichi Gondo, Tokyo (JP); Hiroyuki Aizu, Yokohama (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 14/099,367

(22) Filed: Dec. 6, 2013

(65) Prior Publication Data

US 2014/0164908 A1    Jun. 12, 2014

(30) Foreign Application Priority Data

Dec. 7, 2012 (JP) .................................. 2012-268254

(51) Int. Cl.
    *G06F 17/22*   (2006.01)
    *G06F 3/0481*  (2013.01)
    *G06F 17/30*   (2006.01)

(52) U.S. Cl.
    CPC ........ *G06F 17/2247* (2013.01); *G06F 3/0481* (2013.01); *G06F 17/30902* (2013.01)

(58) Field of Classification Search
    CPC ........... G06F 17/2247; G06F 17/30902; G06F 3/0481; G09G 2340/0407; G09G 2320/0613
    See application file for complete search history.

(56) References Cited

U.S. PATENT DOCUMENTS

| | | | | |
|---|---|---|---|---|
| 6,300,947 B1 * | 10/2001 | Kanevsky | ......... | G06F 17/30905 707/E17.121 |
| 8,159,507 B2 * | 4/2012 | Nishibori | .............. | G06F 3/0346 345/660 |
| 8,527,899 B2 * | 9/2013 | Miyazawa | ......... | H04N 5/44543 715/784 |
| 8,706,802 B1 * | 4/2014 | Dayan | .............. | G06F 17/30905 345/632 |
| 8,823,667 B1 * | 9/2014 | Hill | ......................... | G06F 3/041 345/173 |

(Continued)

FOREIGN PATENT DOCUMENTS

| | | |
|---|---|---|
| JP | 2003-111054 | 4/2003 |
| JP | 2007-043562 | 2/2007 |

(Continued)

OTHER PUBLICATIONS

Clement Nedelcu, Nginx HTTP Server, 2010, Packt Publishing, p. 130, 224.*

(Continued)

*Primary Examiner* — Maikhanh Nguyen
(74) *Attorney, Agent, or Firm* — Nixon & Vanderhye, P.C.

(57) ABSTRACT

According to an embodiment, a content reproducing apparatus includes a determination unit, a decision unit, an acquisition unit and a reproducing unit. The determination unit determines a reproduction condition for first content scheduled to be reproduced. The decision unit decides first acquisition information for acquiring the first content based on the reproduction condition. The acquisition unit acquires the first content using the first acquisition information. The reproducing unit reproduces the first content.

12 Claims, 10 Drawing Sheets

(56) References Cited

U.S. PATENT DOCUMENTS

| | | | |
|---|---|---|---|
| 8,943,414 B2* | 1/2015 | Cahill | G06F 17/30905 715/738 |
| 9,285,883 B2* | 3/2016 | Bi | G06F 1/1694 |
| 2007/0136488 A1 | 6/2007 | Cho et al. | |
| 2008/0111833 A1* | 5/2008 | Thorn | G09G 5/00 345/690 |
| 2008/0165191 A1* | 7/2008 | Kirihara | G06T 3/4084 345/428 |
| 2008/0215966 A1* | 9/2008 | Suarez | G06F 17/30905 715/252 |
| 2010/0057696 A1* | 3/2010 | Miyazawa | H04N 5/44543 707/E17.014 |
| 2010/0118055 A1* | 5/2010 | Nishibori | G06F 3/0346 345/666 |
| 2011/0063316 A1* | 3/2011 | Kimura | H04N 21/4722 345/543 |
| 2011/0191687 A1* | 8/2011 | Takeda | G06F 15/177 715/736 |
| 2012/0072835 A1* | 3/2012 | Gross | G06Q 30/0269 715/243 |
| 2012/0242571 A1 | 9/2012 | Takamura et al. | |
| 2012/0317467 A1* | 12/2012 | Cahill | G06F 17/30905 715/205 |
| 2013/0337866 A1* | 12/2013 | Kim | H04W 4/20 455/557 |

FOREIGN PATENT DOCUMENTS

| | | |
|---|---|---|
| JP | 2007-328658 | 12/2007 |
| JP | 2008-079228 | 4/2008 |
| JP | 2008-236694 | 10/2008 |
| JP | 2008-242888 | 10/2008 |
| JP | 2008-294591 | 12/2008 |
| JP | 2011-227640 | 11/2011 |
| JP | 2012-203485 | 10/2012 |

OTHER PUBLICATIONS

Byung-Gon Chun and Petros Maniatis, Augmented Smartphone Applications Through Clone Cloud Execution, Intel Research Berkeley, 2009.*

URI Scheme, Wikipedia, 23 pages, printed on Dec. 4, 2013.

Marcotte, E., "A List Apart: Responsive Web Design", Issue No. 360, (May 25, 2010), 10 pages.

Office Action dated Jul. 19, 2016 in counterpart Japanese Application No. JP2012-268254 and English-language machine translation thereof (Data Source: Global Dossier; Translated Jul. 20, 2016; Dictionary Last Updated: Jun. 21, 2016).

* cited by examiner

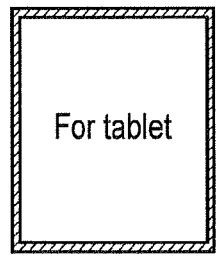
F I G. 4A
F I G. 4B
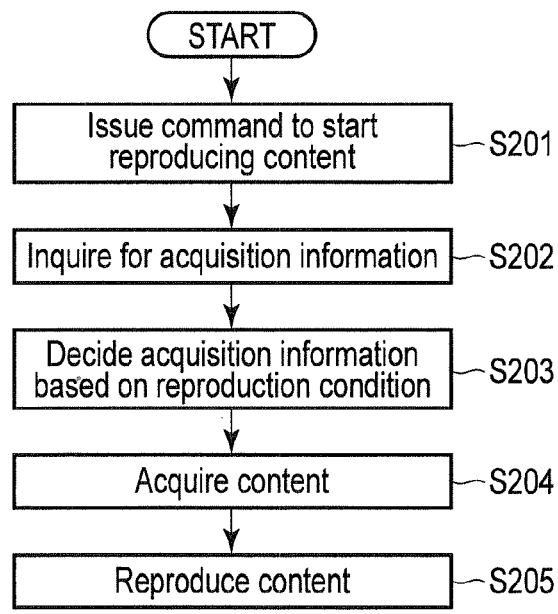
F I G. 5

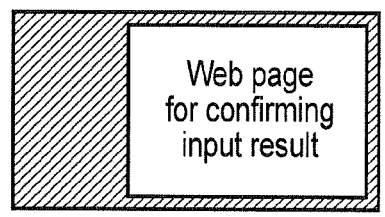
F I G. 7B
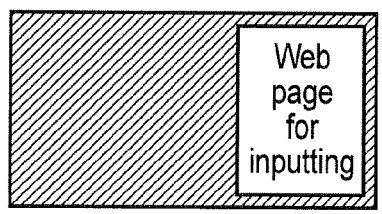
F I G. 7C

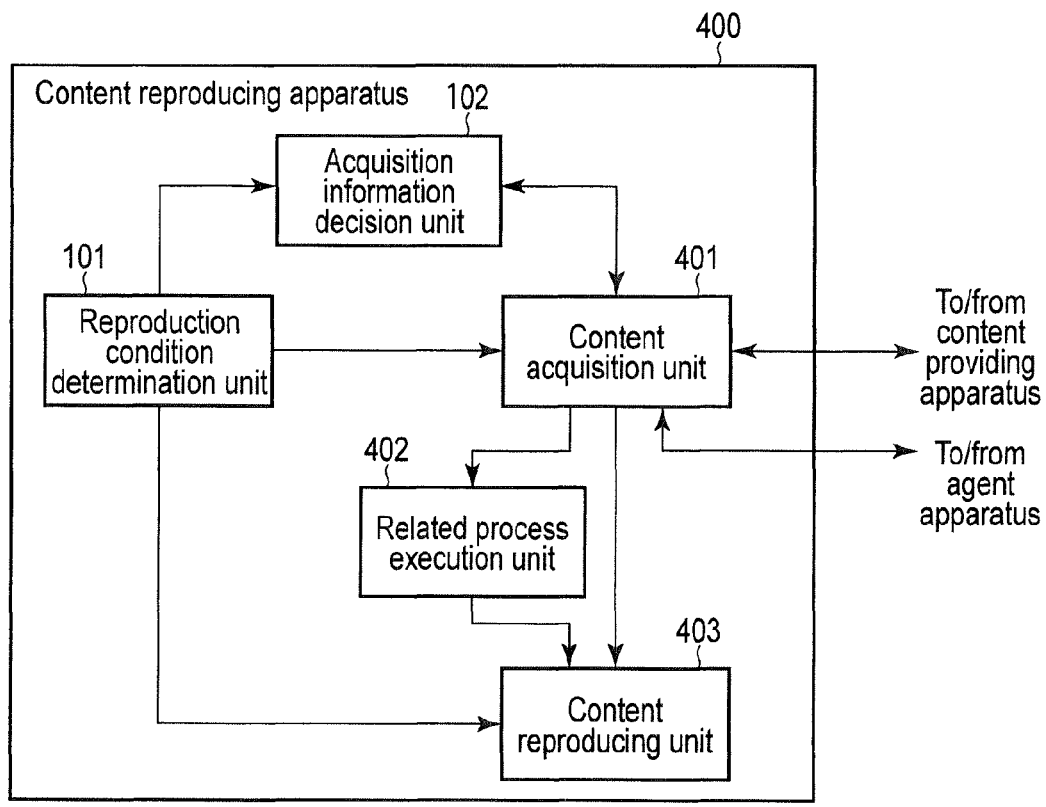
F I G. 9
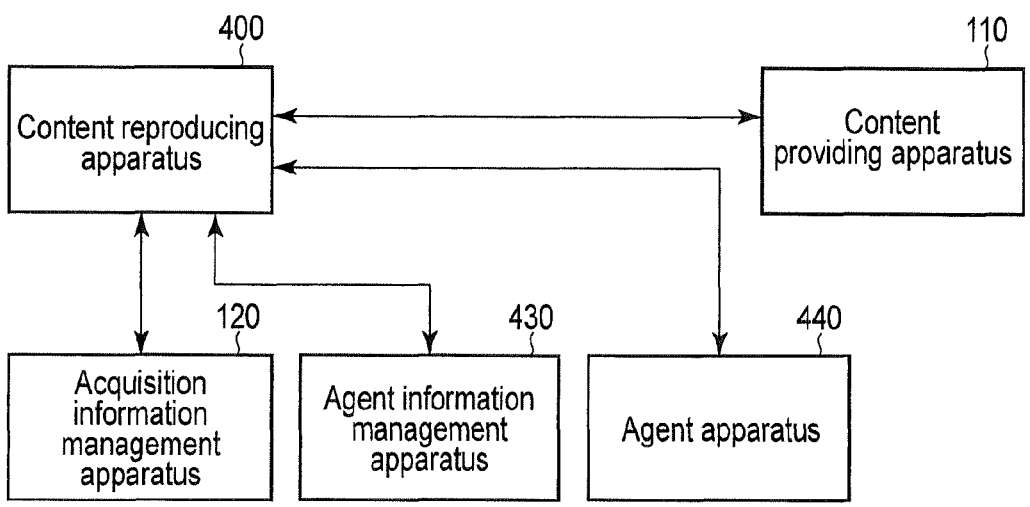
F I G. 10

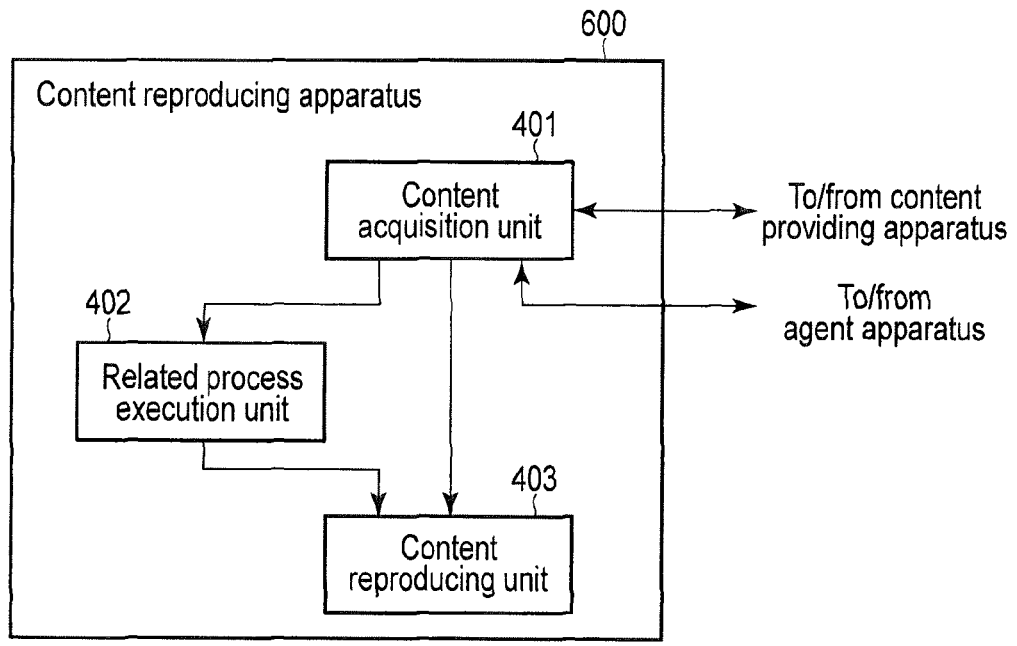
F I G. 13
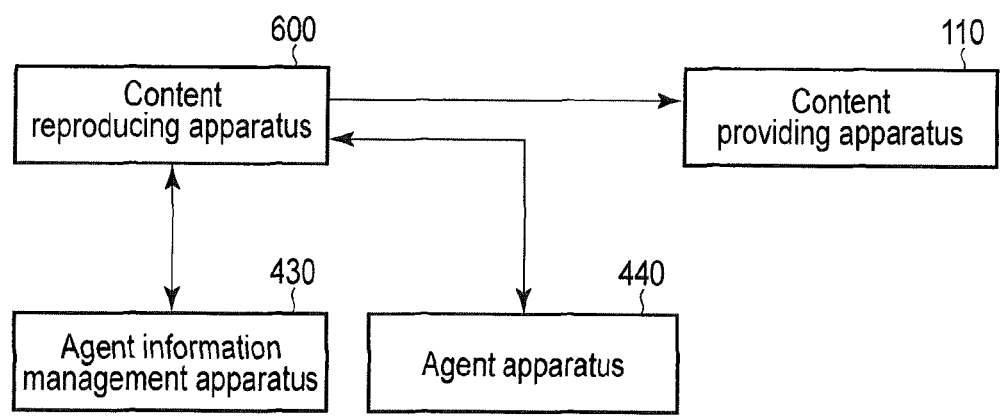
F I G. 14

CONTENT REPRODUCING APPARATUS

CROSS-REFERENCE TO RELATED APPLICATIONS

This application is based upon and claims the benefit of priority from Japanese Patent Application No. 2012-268254, filed Dec. 7, 2012, the entire contents of which are incorporated herein by reference.

FIELD

Embodiments relate to production of content.

BACKGROUND

In recent years, various content reproducing apparatuses capable of reproducing contents (mainly web contents) have been developed. A user can select a desired device from, for example, a desktop PC (Personal Computer), a laptop, a smartphone, a tablet PC, a slate PC, a smart TV, a feature phone, a DAP (Digital Audio Player), a video game machine, and the like for viewing contents. On the other hand, a content reproduction environment has continuously been diversified, and content that can be appropriately reproduced in one reproduction environment may fail to be appropriately reproduced in another reproduction environment.

To deal with the diversified content reproduction environments, techniques have been proposed which enable content to be appropriately reproduced by adapting the content itself to the reproduction environment. One of these techniques is known as responsive web design.

For example, JavaScript provides functions called onOrientationChange and Viewport. Utilizing these functions to produce content allows a content reproducing apparatus to decide the display direction and display size of the content based on the direction, angle of view, size, and the like of a content display screen.

Furthermore, CSS3 provides a function called Media Queries. Utilizing this function to produce content allows the content reproducing apparatus to decide a style to be applied to the content based on the size and the like of the content display screen.

Moreover, HTML5 provides a function called Flexible Images. Utilizing this function to produce content allows the content reproducing apparatus to update the content based on a change in the size of the content display screen.

However, even the use of responsive design has difficulty producing content that can be adapted to all reproduction environments. For example, if content is reproduced in a reproduction environment totally different from a reproduction environment expected to be present during the design of the content, a problem may occur. Thus, production of content adaptable to all reproduction environments needs sufficient knowledge of the content reproducing apparatus and an application for content reproduction (for example, a web browser) as well as an advanced design technique and a sophisticated production flow. Moreover, the design may need to be modified to adapt the content to a newly developed content reproducing apparatus and a newly developed application for content reproduction. Thus, when responsive design is utilized to produce content, a heavy burden is placed on a content producer.

Thus, in general, contents with different designs are produced for respective types of content reproducing apparatuses or respective types of applications for content reproduction. Such a production technique allows the content producer to produce contents with particular designs for particular types of content reproducing apparatuses or particular types of application, reducing the burden associated with the production of content, compared to responsive design. Upon receiving an acquisition request for content, a content providing apparatus (for example, a web server) can determine the type of the content reproducing apparatus or the type of the application based on the acquisition request and select and provide content with the appropriate design. Individual addresses are assigned to the contents with different designs. However, the acquisition request need not contain the address of content with the desired design but may contain a common address for the contents with the different designs. If the types of the content reproducing apparatuses or the types of applications are different from expected types, the content providing apparatus may fail to provide content with the appropriate design.

An example of a measure against this problem involves producing contents for a large number of types of content reproducing apparatuses or a large number of types of applications. However, such a measure increases the total amount of contents produced, resulting in a heavier burden on the content producer or web server operator.

Furthermore, a technique is known which enables invocation of a process from a content reproducing application (for example, a web browser), the process being carried out by an application or a function different from the content reproducing application (that is, an external process). One of these techniques is a uniform resource locator (URL) schema.

The URL schema is associated with an application or a function. The association is carried out, for example, during initial setting for the web browser or during installation of the application. For example, when the content reproducing apparatus reproduces a web page using the web browser, selection of a URL schema "mailto:" contained in the web page causes the web browser to initiate mail software.

However, content with a URL schema is produced on the assumption that the application or function initiated by the URL schema is provided in the content reproducing apparatus. Hence, for example, if content produced for one content reproducing apparatus is reproduced by another content reproducing apparatus, a situation is expected in which the corresponding application or function fails to be activated even by selecting the URL schema contained in the content because the application or function is not provided in the content reproducing apparatus.

BRIEF DESCRIPTION OF THE DRAWINGS

FIG. 4A is a diagram showing an example of display of content in the content reproducing apparatus in FIG. 1;

FIG. 4B is a diagram showing an example of display of content in the content reproducing apparatus in FIG. 1;

FIG. 5 is a flowchart illustrating operation of the content reproducing apparatus in FIG. 1;

FIG. 7B is a diagram showing an example of display of content in the content reproducing apparatus according to the second embodiment;

FIG. 7C is a diagram showing an example of display of content in the content reproducing apparatus according to the second embodiment;

FIG. 9 is a block diagram illustrating a content reproducing apparatus according to a third embodiment;

FIG. 10 is a block diagram illustrating a content reproducing system including the content reproducing apparatus in FIG. 9;

FIG. 13 is a block diagram illustrating a content reproducing apparatus according to a fourth embodiment; and FIG. 14 is a block diagram illustrating a content reproducing system including the content reproducing apparatus in FIG. 13.

DETAILED DESCRIPTION

Figure 1:
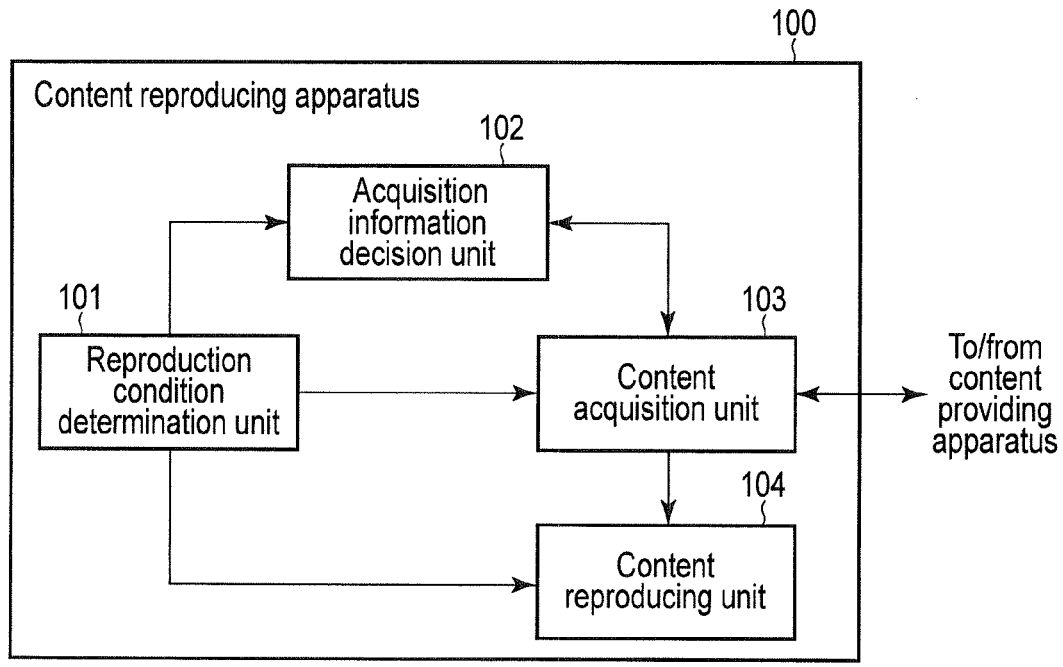
FIG. 1 is a block diagram illustrating a content reproducing apparatus according to a first embodiment.

Embodiments will be described below with reference to the drawings.

According to an embodiment, a content reproducing apparatus includes a determination unit, a decision unit, an acquisition unit and a reproducing unit. The determination unit determines a reproduction condition for first content scheduled to be reproduced. The decision unit decides first acquisition information for acquiring the first content based on the reproduction condition. The acquisition unit acquires the first content using the first acquisition information. The reproducing unit reproduces the first content.

Elements identical or similar to described elements are denoted by identical or similar reference numerals, and duplicate descriptions are basically omitted.

(First Embodiment)

As illustrated in FIG. 1, a content reproducing apparatus 100 comprises a reproduction condition determination unit 101, an acquisition information decision unit 102, a content acquisition unit 103, and a content reproducing unit 104.

The reproduction condition determination unit 101 determines at least a reproduction condition for content scheduled to be reproduced. The reproduction condition determination unit 101 may also determine a reproduction condition for content being reproduced. The reproduction condition determination unit 101 notifies the acquisition information decision unit 102 of information indicative of the determined reproduction condition. The reproduction condition determination unit 101 may also notify the content reproducing unit 104 of the information indicative of the determined reproduction condition. When the reproduction condition for the content changes, the reproduction condition determination unit 101 provides the content acquisition unit 103 with information indicative of the change in the reproduction condition in order to urge the content acquisition unit 103 to re-acquire the content. The reproduction condition determination unit 101 may determine the reproduction condition autonomously or in accordance with a request from the acquisition information decision unit 102 or another element.

The reproduction condition may include the size (that is, the resolution) of a content display screen or area (for example, a window). The reproduction condition may include the angle of view (for example, the aspect ratio) of the content display screen or area. The reproduction condition may include the direction (for example, a landscape mode/portrait mode) of the content display screen or area. The reproduction condition may include the size (actual dimensions) of the content display screen or area in actual space. The reproduction condition may include the distance between a user and the content display screen or area in actual space. The distance may be determined by any distance measuring method using infrared, GPS, or the like.

Moreover, the reproduction condition may include, for example, the user's content viewing status and the user's content utilization status. The user's content viewing status may include, for example, a content viewing time (for example, the current time), content viewers (for example, viewer identification information and the number of viewers), and a content viewing place (for example, latitude and longitude, area, country, and facility type). The user's content utilization status may include, for example, the type of a UI (User Interface) device (for example, a remote controller, a keyboard, a mouse, or a touch panel).

The acquisition information decision unit 102, upon receiving an inquiry for information (hereinafter referred to as acquisition information) for acquisition of content from the content acquisition unit 103, decides the acquisition information. Specifically, the acquisition information decision unit 102 decides the acquisition information based on information indicative of a reproduction condition communicated by the reproduction condition determination unit 101. The acquisition information decision unit 102 notifies the content acquisition unit 103 of the decided acquisition information. The acquisition information decision unit 102 may decide the acquisition information through local access to information stored in the content reproducing apparatus 100 or utilizing information stored outside the content reproducing apparatus 100.

The acquisition information decision unit 102 may decide the acquisition information, for example, utilizing an acquisition information management table. The acquisition information management table may be stored in the content reproducing apparatus 100 or outside the content reproducing apparatus 100. The acquisition information management table associates the reproduction condition with acquisition information for acquisition of content with a design suitable for the reproduction condition.

Figure 3A:
FIG. 3A is a diagram showing an example of display of content in the content reproducing apparatus in FIG. 1.
Figure 3B:
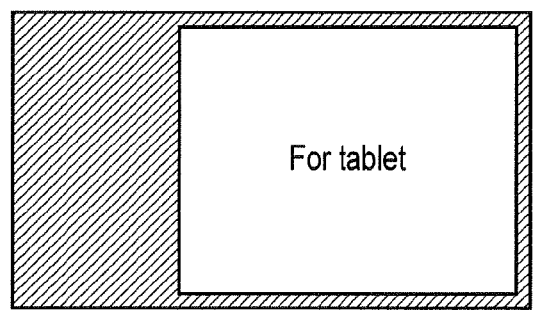
FIG. 3B is a diagram showing an example of display of content in the content reproducing apparatus in FIG. 1.
Figure 3C:
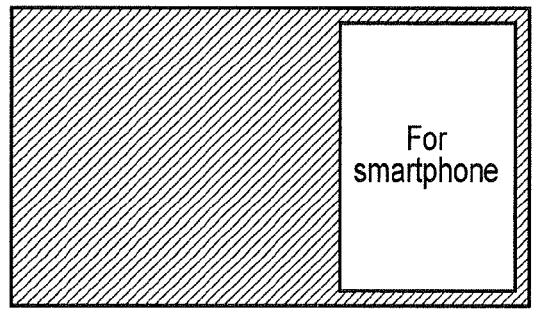
FIG. 3C is a diagram showing an example of display of content in the content reproducing apparatus in FIG. 1.

A certain content providing apparatus (typically a web server) references a value in a user-agent header contained in an acquisition request for content to determine the type of the content reproducing apparatus or the type of the content reproducing application having transmitted the acquisition request, and provides content with a design suitable for the type of the content reproducing apparatus or the type of the content reproducing application. Hence, the acquisition information may include the user-agent header The size of the content display screen or area may be associated with a value in the user-agent header which is indicative of the type of a content reproducing apparatus suitable for the size (for example, a PC (which herein means a desktop PC), a tablet PC, or a smartphone). For example, if the size is larger than a first threshold (for example, a value equal to or larger than the screen resolution of a certain tablet PC), content for a PC may be acquired and reproduced (FIG. 3A). If the size is equal to or smaller than the first threshold and larger than a second threshold (for example, a value equal to or larger than the screen resolution of a certain smartphone), content for a tablet PC may be acquired and reproduced (FIG. 3B). If the size is equal to or smaller than the second threshold, content for a smartphone may be acquired and reproduced (FIG. 3C).

The direction of the display screen or area may be associated with a value in the user-agent header which is indicative of the type of a content reproducing apparatus suitable for the direction. For example, if the direction corresponds to the portrait mode, content for a tablet PC may be acquired and reproduced (FIG. 4A). If the direction corresponds to the landscape mode, content for a PC may be acquired and reproduced (FIG. 4B).

The size of the content display screen or area in the actual space may be associated with a value in the user-agent header which is indicative of the type of a content reproducing apparatus suitable for the size. For example, if the size is larger than a first threshold (for example, a value equal to or larger than the size of a screen of a certain tablet PC in the actual space), content for a PC may be acquired and reproduced (FIG. 3A). If the size is equal to or smaller than the first threshold and larger than a second threshold (for example, a value equal to or larger than the size of a screen of a certain smartphone in the actual space), content for a tablet PC may be acquired and reproduced (FIG. 3B). If the size is equal to or smaller than the second threshold, content for a smartphone may be acquired and reproduced (FIG. 3C).

The distance between the user and the content display screen or area may be associated with a value in the user-agent header which is indicative of the type of a content reproducing apparatus suitable for the distance. For example, if the distance is larger than a threshold, content for a PC may be acquired and reproduced (FIG. 3A). If the distance is equal to or smaller than the threshold, content for a smartphone may be acquired and reproduced (FIG. 3C).

Moreover, the acquisition information may include, in addition to the value in the user-agent header, another parameter. For example, when a command is issued to start reproduction of a web page for a PC, the acquisition information is decided which includes a value in the user-agent header which is indicative of a tablet PC or a smartphone, and an acquisition request with the value in the user-agent header and a URL indicative of the web page set therein is transmitted to the content providing apparatus, the acquisition request may be redirected to a web page for a tablet PC or a smartphone. That is, overhead due to the redirection may occur if the value of the URL corresponding to the value in the user-agent header is not set in the acquisition request.

Hence, to suppress possible redirection, for example, the acquisition information management table may further manage the value of a URL indicative of a redirect destination corresponding to a combination of the value in the user-agent header and the value of the original URL (that is, a URL at which a command to reproduce the content has been issued). The acquisition information decision unit 102 may decide the value in the user-agent header corresponding to the reproduction condition for the content and further decide the value of the URL indicative of the redirect destination corresponding to the combination of the value in the user-agent header and the value of the original URL. In this case, the acquisition information includes, in addition to the value in the user-agent header, the value of the URL indicative of the corresponding redirect destination.

The URL indicative of the redirect destination may be managed by updating the acquisition information management table when the original URL is redirected. Alternatively, information associating the combination of the value in the user-agent header and the value of the original URL with the URL indicative of the redirect destination may be provided outside the content reproducing apparatus 100, for example, in the form of a metafile.

For example, when the user performs an operation of issuing a command to start reproducing content, the content acquisition unit 103 inquires of the acquisition information decision unit 102 for acquisition information to acquire the content. The inquiry may or may not contain information (for example, the value of the URL) on the content for which a command to start reproduction has been issued. Upon being notified of the acquisition information by the acquisition information decision unit 102, the content acquisition unit 103 uses the acquisition information to transmit an acquisition request for the content to the content providing apparatus to acquire the content. For example, if the acquisition information includes a value in the user-agent header, the content acquisition unit 103 may transmit an acquisition request with the value in the user-agent header set therein. If the acquisition information includes the value of the corresponding URL in addition to the value in the user-agent header, the content acquisition unit 103 may transmit an acquisition request with the value in the user-agent header and the value of the URL set therein.

The content acquisition unit 103 provides the acquired content to the content reproducing unit 104. The content acquisition unit 103 may unconditionally or conditionally re-acquire the content being reproduced when notified of information indicative of a change in the reproduction condition by the reproduction condition determination unit 101. The re-acquisition of the content being reproduced allows the content to be adapted to the changed reproduction condition. On the other hand, the re-acquisition of the content may cause a non-preferable situation in which a reproduction time for video content or music content is reset or in which a text being input is cleared.

The content reproducing unit 104 reproduces content provided by the content acquisition unit 103. The content reproducing unit 104 may comprise a display and a speaker. The content reproducing unit 104 may reproduce the content in accordance with information indicative of the reproduction condition (for example, the size, angle of view, or direction of the content display screen or area, or the user's content viewing status or content utilization status) communicated by the reproduction condition determination unit 101.

Figure 2:
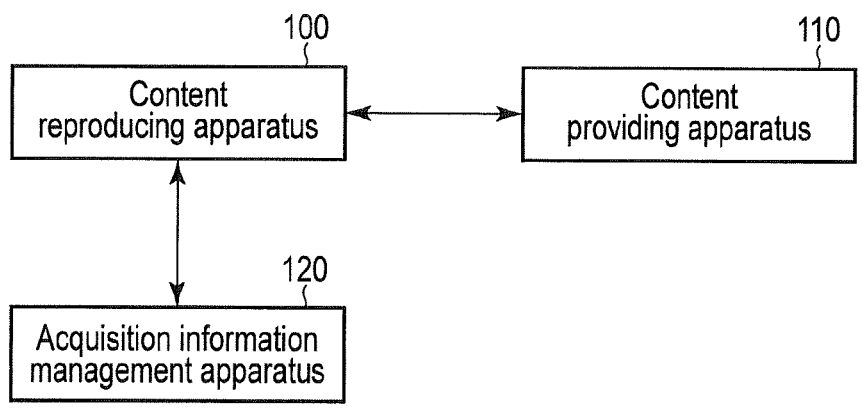
FIG. 2 is a block diagram illustrating a content reproducing system including the content reproducing apparatus in FIG. 1.

As illustrated in FIG. 2, the content reproducing apparatus 100 can form a content reproducing system. The content reproducing system includes the content reproducing apparatus 100, a content providing apparatus 110, and an acquisition information management apparatus 120.

The content providing apparatus 110 provides content in accordance with an acquisition request transmitted by the content acquisition unit 103. The acquisition information management apparatus 120 manages information associating the reproduction condition with the acquisition information, for example, in the form of the above-described acquisition information management table. The acquisition information management apparatus 120 can assist the acquisition information decision unit 102 in a process of deciding the acquisition information. Specifically, the acquisition information management apparatus 120 may notify the acquisition information decision unit 102 of the decided acquisition information or provide the acquisition information management table to the acquisition information decision unit 102, depending on an inquiry (including the information indicative of the reproduction condition) from the acquisition information decision unit 102.

When the acquisition information decision unit 102 can decide the acquisition information through local access in the content reproducing apparatus 100, the acquisition information management apparatus 120 is unnecessary. For example, when the acquisition information management table is stored in the content reproducing apparatus 100, the acquisition information management apparatus 120 is unnecessary.

The content reproducing apparatus 100 operates as illustrated in FIG. 5. For example, when the user performs an operation of issuing a command to start reproducing content (step S201), the content acquisition unit 103 inquires of the acquisition information decision unit 102 for the acquisition information (step S202).

Upon receiving the inquiry in step 5202, the acquisition information decision unit 102 decides the acquisition information based on the information indicative of the reproduction condition and communicated by the reproduction condition determination unit 101 (step S203).

The content acquisition unit 103 transmits an acquisition request for the content to the content providing apparatus using the acquisition information decided in step 203, to acquire the content (step S204). The content reproducing unit 104 reproduces the content acquired in step S204 (step S205).

As described above, the content reproducing apparatus according to the first embodiment decides the acquisition information based on the reproduction condition for the content scheduled to be reproduced, and acquires the content using the decided acquisition information. Thus, the content reproducing apparatus automatically acquires content with a design suitable for the reproduction condition, allowing the appropriate reproduction even of content not produced to be adaptable to the reproduction environment.

That is, the content reproducing apparatus can appropriately reproduce even content produced for a different type of device. For example, a utility form can be implemented in which a smart TV displays news content for a smartphone in a corner of the screen while reproducing a TV program. A utility form can also be implemented in which, when the size of the display area for the content is changed, a site for smartphones is automatically switched to a site for PCs for display. Hence, the content reproducing apparatus can improve the convenience offered while the user is viewing contents. The content reproducing apparatus can further reutilize content produced for existing devices in accordance with the reproduction condition, and thus, the content producer and a content manager can allow the content reproducing apparatus to utilize a wealth of contents while saving production costs and management costs.

(Second Embodiment)

The content reproducing apparatus according to the first embodiment automatically acquires content with a design suitable for the reproduction condition. A content reproducing apparatus according to a second embodiment starts reproducing content different from the content being reproduced, in accordance with a change in the reproduction condition. The content reproducing apparatus according to the present embodiment differs from the content reproducing apparatus 100 in FIG. 1 in a part of the operation. The content reproducing apparatus according to the present embodiment may form a content reproducing system identical or similar to the content reproducing apparatus illustrated in FIG. 2.

According to the present embodiment, a reproduction condition determination unit 101 determines at least a reproduction condition for content being reproduced. As is the case with the first embodiment, the reproduction condition determination unit 101 may further determine a reproduction condition for content scheduled to be reproduced. The reproduction condition determination unit 101 notifies an acquisition information decision unit 102 of information indicative of the determined reproduction condition. The reproduction condition determination unit 101 may further notify a content reproducing unit 104 of the information indicative of the determined reproduction condition. When the reproduction condition is changed, the reproduction condition determination unit 101 may notify a content acquisition unit 103 of information indicative of the change in the reproduction condition in order to urge the content acquisition unit 103 to acquire content (next content) different from the content being reproduced. The reproduction condition determination unit 101 may determine the reproduction condition autonomously or in accordance with a request from the acquisition information decision unit 102 or another element. The reproduction condition may be identical or similar to the reproduction condition described in the first embodiment.

According to the present embodiment, the acquisition information decision unit 102, upon receiving an inquiry for acquisition information from the content acquisition unit 103, decides the acquisition information. Specifically, the acquisition information decision unit 102 decides the acquisition information based on information indicative of the reproduction condition communicated by the reproduction condition determination unit 101. The acquisition information decision unit 102 notifies the content acquisition unit 103 of the decided acquisition information. The acquisition information decision unit 102 may decide the acquisition information through local access to information stored in the content reproducing apparatus 100 or utilizing information stored outside the content reproducing apparatus 100.

The acquisition information decision unit 102 may decide the acquisition information, for example, by utilizing an acquisition information management table. The acquisition information management table may be stored in the content reproducing apparatus 100 or outside the content reproducing apparatus 100. The acquisition information management table associates the reproduction condition with acquisition information (typically, the value of a URL) for acquisition of a next content. Alternatively, the acquisition information management table may associate a combination of the reproduction condition and information (typically, the value of a URL) on the content being reproduced with the acquisition information (typically, the value of a URL) for acquisition of the next content.

Figure 6A:
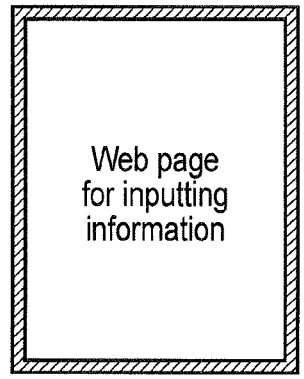
FIG. 6A is a diagram showing an example of display of content in a content reproducing apparatus according to a second embodiment.
Figure 6B:
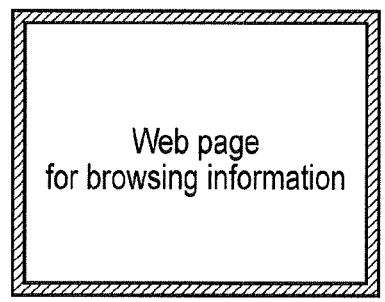
FIG. 6B is a diagram showing an example of display of content in the content reproducing apparatus according to the second embodiment.

The direction of a display screen or area may be associated with the value of a URL identifying the next content to be acquired. For example, when the direction changes to a portrait mode while a web page for browsing information is being reproduced, a web page for inputting information corresponding to the web page for browsing information may be acquired and reproduced (FIG. 6A). When the direction changes to a landscape mode while the web page for inputting information is being reproduced, the web page for browsing information corresponding to the web page for inputting information may be acquired and reproduced (FIG. 6B).

Figure 7A:
FIG. 7A is a diagram showing an example of display of content in the content reproducing apparatus according to the second embodiment.

The size of the content display screen or area may be associated with the value of the URL identifying the next content to be acquired. For example, when the size changes to a value larger than a first threshold while a web page for inputting or a web page for confirming input result is being reproduced, a web page for browsing analysis result corresponding to the web page for inputting or the web page for confirming input result may be acquired and reproduced (FIG. 7A). When the size changes to a value equal to or smaller than the first threshold and larger than a second threshold while the web page for inputting or the web page for browsing analysis result is being reproduced, a web page for confirming input result corresponding to the web page for inputting or the web page for browsing analysis result may be acquired and reproduced (FIG. 7B). When the size changes to a value equal to or smaller than the second threshold while the web page for confirming input result or the web page for browsing analysis result is being reproduced, a web page for inputting corresponding to the web page for confirming input result or the web page for browsing analysis result may be acquired and reproduced (FIG. 7C).

The distance between the content display screen or area and the user may be associated with the value of the URL identifying the next content to be acquired. For example, when the distance changes to a value larger than a threshold while a web page for inputting information is being reproduced, a web page for browsing information corresponding to the web page for inputting information may be acquired and reproduced (FIG. 6B). When the distance changes to a value equal to or smaller than the threshold while the web page for browsing information is being reproduced, a web page for inputting information corresponding to the web page for browsing information may be acquired and reproduced (FIG. 6A).

According to the present embodiment, the content acquisition unit 103, upon being notified of information indicative of a change in the reproduction condition by the reproduction condition determination unit 101, inquires of the acquisition information decision unit 102 for acquisition information for acquisition of the next content. The inquiry may or may not contain information (for example, the value of a URL) on content being reproduced. Furthermore, for example, when the user performs an operation of issuing a command to start reproducing content, the content acquisition unit 103 may inquire for the acquisition information or transmit the acquisition information based on the command.

Upon being notified of the acquisition information by the acquisition information decision unit 102, the content acquisition unit 103 transmits an acquisition request for the content to the content providing apparatus using the acquisition information to acquire the content. For example, if the acquisition information includes the value of the URL of the next content to be acquired, the content acquisition unit 103 may transmit an acquisition request with the value of the URL set therein. The content acquisition unit 103 provides the acquired content to the content reproducing unit 104.

According to the present embodiment, the content reproducing unit 104 reproduces the content provided by the content acquisition unit 103. The content reproducing unit 104 may comprise a display and a speaker. The content reproducing unit 104 may reproduce the content in accordance with information indicative of the reproduction condition (for example, the size, angle of view, or direction of the content display screen or area, or the user's content viewing status or content utilization status) communicated by the reproduction condition determination unit 101.

Figure 8:
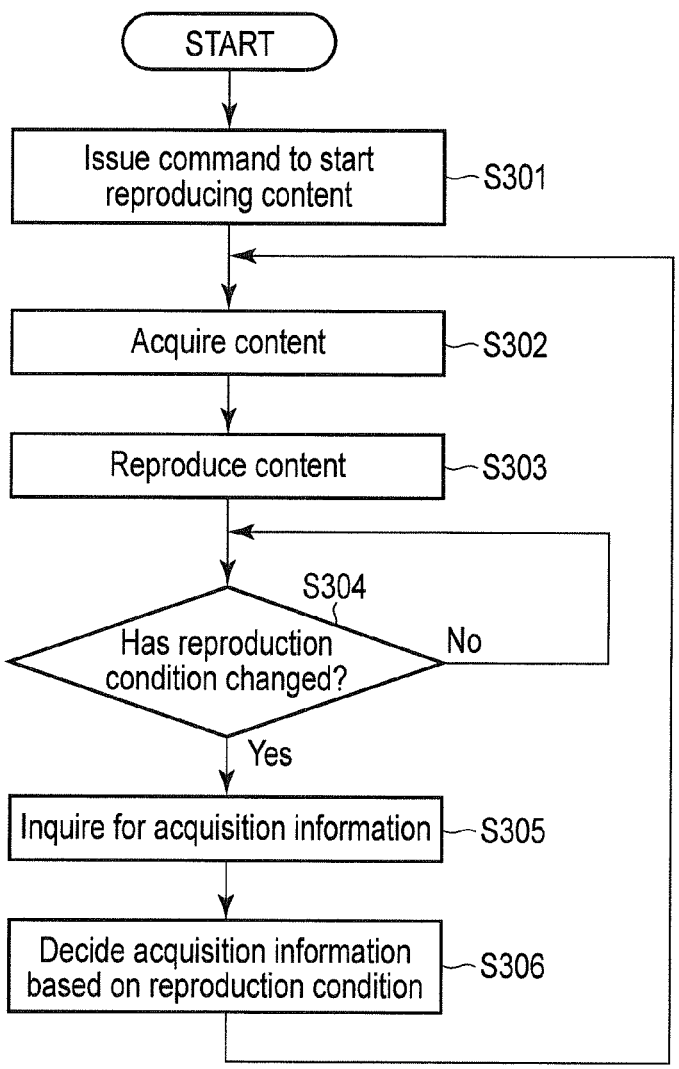
FIG. 8 is a flowchart illustrating operation of the content reproducing apparatus according to the second embodiment.

According to the present embodiment, the content reproducing apparatus 100 operates as illustrated in FIG. 8. For example, when the user performs an operation of issuing a command to start reproducing content (step S301), the process proceeds to step S302. Step S202 and step S203 described above may be inserted between step S301 and step S302.

In step S302, the content acquisition unit 103 transmits an acquisition request for the content to the content providing apparatus to acquire the content. The content reproducing unit 104 reproduces the content acquired in step S302 (step S303).

When the reproduction condition determination unit 101 determines a change in the reproduction condition during reproduction of the content (step S304), the reproduction condition determination unit 101 notifies the content acquisition unit 103 of information indicative of the change. Upon being notified of the change in the reproduction condition, the content acquisition unit 103 inquires of the acquisition information decision unit 102 for acquisition information for acquisition of next content (step S305).

Upon receiving the inquiry in step S305, the acquisition information decision unit 102 decides the acquisition information based on the information indicative of the reproduction condition communicated by the reproduction condition determination unit 101 (step S306). The process then returns to step S302.

As described above, the content reproducing apparatus according to the second embodiment decides acquisition information for acquisition of the next content in accordance with a change in the reproduction condition for the content, and acquires the next content using the decided acquisition information. Thus, the content reproducing apparatus automatically changes the reproduced content in accordance with the change in the reproduction condition, allowing improvement of convenience offered while the user is viewing the content.

(Third Embodiment)

As illustrated in FIG. 9, a content reproducing apparatus 400 according to a third embodiment comprises a reproduction condition determination unit 101, an acquisition information decision unit 102, a content acquisition unit 401, a related process execution unit 402, and a content reproducing unit 403.

According to the present embodiment, the reproduction condition determination unit 101 may be identical or similar to the reproduction condition determination unit 101 described in the first embodiment or may be identical or similar to the reproduction condition determination unit 101 described in the second embodiment.

According to the present embodiment, the acquisition information decision unit 102 may be identical or similar to the acquisition information decision unit 102 described in the first embodiment or may be identical or similar to the acquisition information decision unit 102 described in the second embodiment.

The content acquisition unit 401 may or may not have functions identical or similar to the functions of the content acquisition unit 103 described in the first embodiment. The content acquisition unit 401 may or may not have functions identical or similar to the functions of the content acquisition unit 103 described in the second embodiment.

When, for example, the user performs an operation of selecting invoking information (typically, a URL schema or a URL) for an external process, the content acquisition unit 401 detects an invocation of the external process. The external process as used herein means a process carried out by an application or a function different from a content reproducing application (for example, a web browser).

The content acquisition unit 401 determines whether or not any agent apparatus is associated with invoking information for an external process. Specifically, the content acquisition unit 401, for example, references an agent information management table to determine whether or not the table has any agent apparatus recorded therein which is associated with the invoking information for the external process. The agent information management table associates invoking information for external processes with information on agent apparatuses capable of carrying out the external processes. The agent information management table may be stored in the content reproducing apparatus 400 or outside the content reproducing apparatus 400. If any agent apparatus is associated with the invoking information for the external process, the content acquisition unit 401 transfers the external process to the agent apparatus.

If no agent apparatus is associated with the invoking information for the external process, the content acquisition unit 401 further determines whether or not the external process can be carried out by the related process execution unit 402. Specifically, the content acquisition unit 401, for example, references a related process information management table to determine whether or not any application or function associated with the invoking information for the external process is recorded in the table. The related process information management table associates invoking information for external processes with application information or function information. The related process information management table may be stored in the content reproducing apparatus 400 or outside the content reproducing apparatus 400. It should be noted that the functions or applications recorded in the related process information management table are provided in the related process execution unit 402. When the external process can be carried out by the related process execution unit 402, the content acquisition unit 401 transfers the external process to the related process execution unit 402.

When no agent apparatus is associated with the invoking information for the external process and the external process is impossible to execute by the related process execution unit 402, the content acquisition unit 401 may acquire alternative content. The alternative content may be acquired from a content providing apparatus or by a local access in the content reproducing apparatus 400. The content acquisition unit 401 may also acquire alternative content when an agent apparatus associated with the invoking information for the external process is present but when the agent apparatus is impossible to access. Upon acquiring the alternative content, the content acquisition unit 401 provides the alternative content to the content reproducing unit 403.

The alternative content means content reproduced by the content reproducing unit 403 when the external process is not carried out. The alternative content may be a web page recommending that the user purchases an agent apparatus or an application that can carry out the external process, a web page showing the user how to record an agent apparatus, or a web page simply informing the user of an execution error in the external process.

The content acquisition unit 401 may make the determination in the order opposite to the above-described order. Specifically, the content acquisition unit 401 may determine whether or not the external process invoked by the invoking information can be executed by the related process execution unit 402, and if the external process is impossible to carry out by the related process execution unit 402, further determine whether or not any agent apparatus is associated with the invoking information.

The external process may be executable by the related process execution unit 402, and an agent apparatus associated with the invoking information for the external process may be present. Moreover, it can be assumed that a plurality of related process execution units 402 can carry out the external process and that a plurality of agent apparatuses are associated with the invoking information for the external process. In such a case, the content acquisition unit 401 may automatically select or the user may select one of the related process execution units 402 or the agent apparatuses to which the external process is to be transferred.

For the selection of the transfer destination of the external process by the content acquisition unit 401, a single selection criterion may be set for the invoking information for all the external processes or different selection criteria may be set for the invoking information for the respective external processes. Furthermore, if the user selects the transfer destination of the external process, the content reproducing unit 403 may present a list of candidates for the transfer destination to the user when the external process is invoked, and receive selection by the user. The presentation of the candidate list may be performed only at the first invocation of an external process or every time an external process is invoked. Alternatively, the user may manually make a setting for the transfer destination when an agent apparatus is recorded.

Figure 11A:
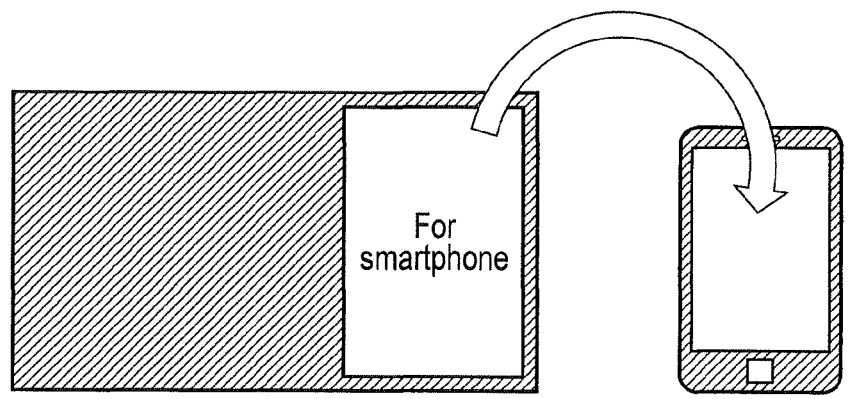
FIG. 11A is a diagram illustrating operation of the content reproducing apparatus in FIG. 9.
Figure 11B:
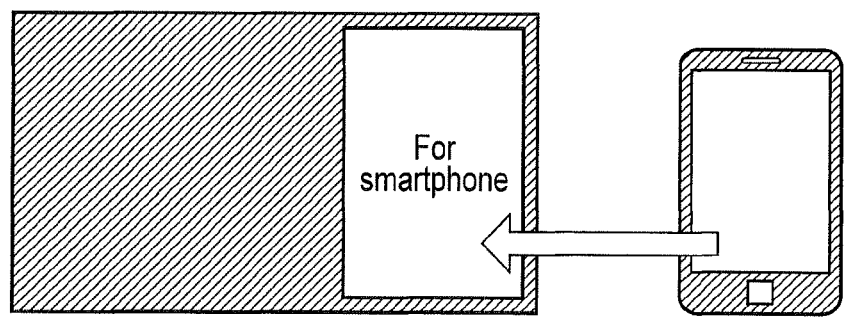
FIG. 11B is a diagram illustrating the operation of the content reproducing apparatus in FIG. 9.

As described above, an external process transferred to an agent apparatus is executed by the agent apparatus (FIG. 11A). The result of the execution of the external process by the agent apparatus may (FIG. 11B) or may not be transferred to the content acquisition unit 401. Moreover, the result of the execution may be transferred without any change or converted into another form before being transferred. For example, the agent apparatus may display the result of the execution on the screen, create display screen data using a screen capture function, and transfer the display screen data to the content acquisition unit 401. The content acquisition unit 401 provides the content reproducing unit 403 with the result of the execution of the external process from the agent apparatus.

When the content reproducing unit 403 reproduces the result of the execution of the external process by the agent apparatus, the content is continuously reproduced in the content reproducing unit 403. This allows improvement of convenience offered while the user is viewing the content.

When the external process from the content acquisition unit 401 is transferred to the related process execution unit 402, the related process execution unit 402 carries out the external process using an application or a function corresponding to the invoking information for the external process. The related process execution unit 402 provides the result of the execution of the external process to the content reproducing unit 403.

The content reproducing unit 403 may or may not have functions identical or similar to the functions of the content reproducing unit 104 described in the first embodiment. The content reproducing unit 403 may or may not have functions identical or similar to the functions of the content reproducing unit 104 described in the second embodiment.

When the content reproducing unit 403 inputs the result of the execution of the external process from the related process execution unit 402, the content reproducing unit 403 reproduces the result of the execution. Furthermore, when the content reproducing unit 403 inputs the result of the execution of the external process by the agent apparatus from the content acquisition unit 401, the content reproducing unit 403 reproduces the result of the execution. Moreover, when the content reproducing unit 403 inputs alternative content from the content acquisition unit 401, the content reproducing unit 403 reproduces the alternative content.

As illustrated in FIG. 10, the content reproducing apparatus 400 can form a content reproducing system. The content reproducing system in FIG. 10 includes the content reproducing apparatus 400, the content providing apparatus 110, an acquisition information management apparatus 120, an agent information management apparatus 430, and an agent apparatus 440. The content providing apparatus 110 and the acquisition information management apparatus 120 are as described with reference to FIG. 2.

The agent information management apparatus 430 associates invoking information for external processes with information on agent apparatuses, for example, in the form of the above-described agent information management table. The agent information management apparatus 430 can assist the content acquisition unit 401 in a process of determining whether or not any agent apparatus is associated with invoking information for an external process. Specifically, in accordance with an inquiry (including the invoking information for the external process) from the content acquisition unit 401, the agent information management apparatus 430 may notify the content acquisition unit 401 of the result of the determination (for example, information on an agent apparatus associated with invoking information for the external process or information indicating that no agent apparatus is recorded which is associated with the invoking information for the external process) or provide the above-described agent information management table to the content acquisition unit 401.

If the content acquisition unit 401 can determine, through local access in the content reproducing apparatus 400, whether or not any agent apparatus is associated with the invoking information for the external process, the agent information management apparatus 430 is unnecessary. For example, if the agent information management table is stored in the content reproducing apparatus 400, the agent information management apparatus 430 is unnecessary.

The agent apparatus 440 is typically a content reproducing apparatus of a type different from the type of the content reproducing apparatus 400 but is not limited to this. Furthermore, the agent apparatus 440 may be a real machine, for example, a smartphone, or a VM (Virtual Machine) server providing cloud computing.

Figure 12:
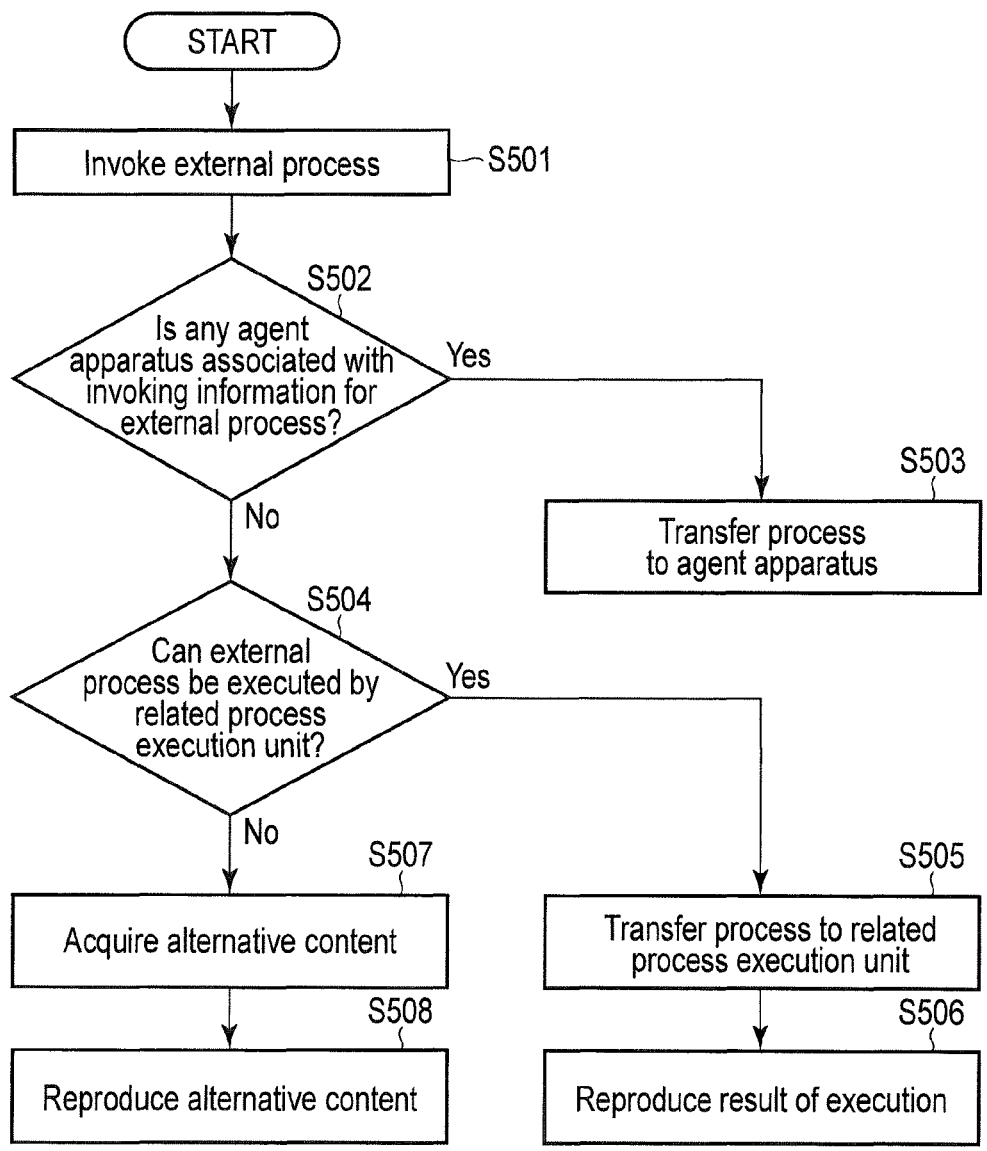
FIG. 12 is a flowchart illustrating the operation of the content reproducing apparatus in FIG. 9.

The content reproducing apparatus 400 operates as illustrated in FIG. 12. For example, when the user performs an operation of invoking an external process (step S501), the content acquisition unit 401 determines whether or not any agent apparatus is associated with the invoking information for the external process (step S502).

In step S502, if any agent apparatus is associated with the invoking information for the external process, the content acquisition unit 401 transfers the external process to the agent apparatus (step S503). As described above, the agent apparatus may transfer the result of the execution of the external process to the content acquisition unit 401. In such a case, the content reproducing unit 403 may reproduce the result of the execution of the external process by the agent apparatus.

In step S502, if no agent apparatus is associated with the invoking information for the external process, the content acquisition unit 401 determines whether or not the external process can be carried out by the related process execution unit 402 (step S504). Step S502 and step S504 may be reordered or carried out in parallel.

In step S504, if the external process can be carried out by the related process execution unit 402, the content acquisition unit 401 transfers the external process to the related process execution unit 402 (step S505). The related process execution unit 402 executes the external process and provides the result of the execution to the content reproducing unit 403. The content reproducing unit 403 reproduces the result of the execution (step S506).

In step S504, if the external process is impossible to execute by the related process execution unit 402, the content acquisition unit 401 acquires alternative content (step S507). The content reproducing unit 403 reproduces the alternative content acquired in step S507.

As described above, when an external process is invoked, the content reproducing apparatus according to the third embodiment determines whether or not any agent apparatus is associated with the invoking information for the external process. If such an agent apparatus is present, the content reproducing apparatus transfers the external process. Thus, even when an external process is invoked which the content reproducing apparatus is unable to carry out, the content reproducing apparatus can carry out the external process through an agent apparatus.

That is, the content reproducing apparatus can normally reproduce even content involving invocation of an external apparatus that is impossible to execute by the content reproducing apparatus. For example, a smart TV can normally reproduce content produced for smartphones. Hence, the content reproducing apparatus enables improvement of convenience offered while the user is viewing content. Moreover, the content reproducing apparatus can reutilize content produced for an existing device and needing to utilize an application or a function provided in the device. Thus, the content producer and content manager can allow the content reproducing apparatus to utilize a wealth of contents while saving production costs and management costs.

(Fourth Embodiment)

As illustrated in FIG. 13, a content reproducing apparatus 600 according to a fourth embodiment comprises a content acquisition unit 401, a related process execution unit 402, and a content reproducing unit 403. The content acquisition unit 401, the related process execution unit 402, and the content reproducing unit 403 are as described with reference to FIG. 9.

As illustrated in FIG. 14, the content reproducing apparatus 600 can form a content reproducing system. The content reproducing system in FIG. 14 includes the content reproducing apparatus 600, a content providing apparatus 110, an agent information management apparatus 430, and an agent apparatus 440. The content providing apparatus 110 is as described with reference to FIG. 2. The agent information management apparatus 430 and the agent apparatus 440 are as described with reference to FIG. 10.

The content reproducing apparatus according to the fourth embodiment can exert effects identical or similar to the effects of the content reproducing apparatus according to the third embodiment.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content reproducing apparatus comprising:
a computer including hardware, the computer being configured to control the content reproducing apparatus to perform operations comprising:
determining a reproduction condition for first content scheduled to be reproduced, wherein the first content is produced in advance for at least one type of device and is stored in a content providing apparatus;
deciding first acquisition information for acquiring the first content produced in advance for a specific type of device corresponding to the reproduction condition;
acquiring the first content produced in advance for the specific type of device using the first acquisition information;
reproducing the first content, wherein the first acquisition information includes a value in a user-agent header which is variable dependent on the reproduction condition;
determining whether any agent apparatus is associated with invoking information for an external process carried out by at least one of an application and a function different from an application for reproducing the first content when the external process is invoked;
when the determining determines an agent apparatus is associated with the invoking information for the external process, transferring the external process to the agent apparatus, acquiring a result of execution of the external process from the agent apparatus, and reproducing the result of the execution of the external process acquired from the agent apparatus;
when the determining determines no agent apparatus is associated with the invoking information for the external process, further determining whether the external process is executable by the content reproduction apparatus; and
when the further determining determines that the external process is executable by the content reproduction apparatus, executing the external process and reproducing a result of execution of the external process.

2. The apparatus according to claim 1, wherein the first acquisition information further includes a value of a URL indicative of a redirect destination corresponding to the value in the user-agent header.

3. The apparatus according to claim 1, wherein the reproduction condition includes at least one of a resolution, a direction, and an angle of view of at least one of an area and a screen in which the first content is displayed.

4. The apparatus according to claim 1, wherein the reproduction condition includes a distance between a user and at least one of an area and a screen in which the first content is displayed.

5. The apparatus according to claim 1, wherein the reproduction condition includes a size, in actual space, of at least one of an area and a screen in which the first content is displayed.

6. The apparatus according to claim 1, wherein the reproduction condition includes a user's viewing status for the first content.

7. The apparatus according to claim 1, wherein the reproduction condition includes a user's utilization status for the first content.

8. The apparatus according to claim 1, wherein the computer is configured to control the content reproducing apparatus to perform further operations comprising:
determining a change in the reproduction condition for the first content during reproducing of the first content,
deciding second acquisition information for acquiring second content reproduced subsequent to the first content based on the change in the reproduction condition,
acquiring the second content using the second acquisition information, and
reproducing the second content.

9. The apparatus according to claim 8, wherein the second acquisition information includes a value of a uniform resource locator (URL) for acquiring the second content.

10. The apparatus according to claim 1, wherein the invoking information for the external process includes at least one of a uniform resource locator (URL) schema and a URL.

11. The apparatus according to claim 1, wherein the computer is configured to control the content reproducing apparatus to perform further operations comprising acquiring alternative content when the external process is determined to be not executable by the content reproducing apparatus, and
reproducing the alternative content.

12. A non-transitory computer readable storage medium storing instructions of a computer program which, when executed by a computer, causes the computer to perform operations comprising:
determining a reproduction condition for first content scheduled to be reproduced, wherein the first content is produced in advance for at least one type of device and is stored in a content providing apparatus;
deciding first acquisition information for acquiring the first content produced in advance for a specific type of device corresponding to the reproduction condition;

acquiring the first content produced in advance for the specific type of device using the first acquisition information;

reproducing the first content, wherein the first acquisition information includes a value in a user-agent header which is variable dependent on the reproduction condition;

determining whether any agent apparatus is associated with invoking information for an external process carried out by at least one of an application and a function different from an application for reproducing the first content when the external process is invoked;

when the determining determines an agent apparatus is associated with the invoking information for the external process, transferring the external process to the agent apparatus, acquiring a result of execution of the external process from the agent apparatus, and reproducing the result of the execution of the external process acquired from the agent apparatus;

when the determining determines no agent apparatus is associated with the invoking information for the external process, further determining whether the external process is executable by the content reproduction apparatus; and when the further determining determines that the external process is executable by the content reproduction apparatus, executing the external process and reproducing a result of execution of the external process.

* * * * *